US011524360B2

(12) United States Patent
Polk et al.

(10) Patent No.: US 11,524,360 B2
(45) Date of Patent: Dec. 13, 2022

(54) MARKING SYSTEM FOR DECORATING WORKPIECES

(71) Applicant: Shutterfly, LLC, Redwood City, CA (US)

(72) Inventors: Michael Lane Polk, Mint Hill, NC (US); David Lynn Hall, Fort Mill, SC (US)

(73) Assignee: Shutterfly, LLC, Redwood City, CA (US)

( * ) Notice: Subject to any disclaimer, the term of this patent is extended or adjusted under 35 U.S.C. 154(b) by 667 days.

(21) Appl. No.: 16/445,639

(22) Filed: Jun. 19, 2019

(65) Prior Publication Data
US 2020/0016690 A1 Jan. 16, 2020

Related U.S. Application Data

(60) Provisional application No. 62/695,928, filed on Jul. 10, 2018.

(51) Int. Cl.
*B23K 26/03* (2006.01)
*B41M 5/26* (2006.01)
(Continued)

(52) U.S. Cl.
CPC ......... *B23K 26/032* (2013.01); *B23K 26/043* (2013.01); *B23K 26/0665* (2013.01);
(Continued)

(58) Field of Classification Search
CPC ................................ B41M 5/262; B41M 5/26
See application file for complete search history.

(56) References Cited

U.S. PATENT DOCUMENTS 5,297,023 A * 3/1994 Seki ................. G05B 19/40931
700/87
5,821,497 A * 10/1998 Yamazaki .......... B23K 26/0838
219/121.73
(Continued)

FOREIGN PATENT DOCUMENTS

CN 107350629 A * 11/2017
GB 2152436 A * 8/1985 ................ B41J 3/28
(Continued)

OTHER PUBLICATIONS

Machine translation of Japan Patent No. 2012061494A, Mar. 2022. (Year: 2022).*

(Continued)

*Primary Examiner* — Geoffrey S Evans
(74) *Attorney, Agent, or Firm* — Merchant & Gould P.C.

(57) ABSTRACT

A marking system for decorating one or more workpieces includes a plurality of marking stations that can mark product images on blank workpieces to produce product workpieces, at least some of which have different sizes, shapes, materials, or a combination thereof, a control system that can select one of the plurality of marking stations and send product image data to the selected one of the plurality of marking stations, and a robotic manipulator that can transport a blank workpiece to the selected marking station under the control of the robotic manipulator. The selected marking station can mark the product image the blank workpiece based on the product image data which produces a product workpiece. The robotic manipulator can remove the product workpiece from the selected one of the plurality of marking stations.

20 Claims, 4 Drawing Sheets

(51) Int. Cl.
*B23K 26/04* (2014.01)
*B44B 3/00* (2006.01)
*B23K 26/08* (2014.01)
*B23K 26/06* (2014.01)
*B41J 3/407* (2006.01)

(52) U.S. Cl.
CPC ......... *B23K 26/0861* (2013.01); *B41J 3/4073* (2013.01); *B41M 5/262* (2013.01); *B44B 3/009* (2013.01)

(56) References Cited

U.S. PATENT DOCUMENTS

| | | | | |
|---|---|---|---|---|
| 2001/0012055 | A1* | 8/2001 | Mori | B44B 7/007 |
| | | | | 348/61 |
| 2007/0144652 | A1* | 6/2007 | Ratcliffe | B44C 1/26 |
| | | | | 156/53 |
| 2007/0238046 | A1* | 10/2007 | Sutter | B23K 26/0613 |
| | | | | 430/270.1 |
| 2007/0289956 | A1* | 12/2007 | Knysh | G05B 19/41815 |
| | | | | 219/121.68 |
| 2014/0332511 | A1* | 11/2014 | Daily | B23K 26/082 |
| | | | | 219/121.69 |
| 2017/0368840 | A1* | 12/2017 | Song | B23K 26/354 |
| 2018/0174007 | A1* | 6/2018 | Imamura | B23K 26/389 |

FOREIGN PATENT DOCUMENTS

JP 2012061494 A * 3/2012
JP 2012061495 A * 3/2012

OTHER PUBLICATIONS

Machine translation of Japan Patent No. 2012061495A, Mar. 2022. (Year: 2022).*
Machine translation of CN107350629A, Mar. 2022 (Year: 2022).*

* cited by examiner

MARKING SYSTEM FOR DECORATING WORKPIECES

CROSS-REFERENCE TO RELATED APPLICATIONS

This application claims benefit of priority to U.S. Provisional Application No. 62/695,928, filed Jul. 10, 2018, the entire disclosure of which is hereby incorporated herein by reference.

BACKGROUND OF THE INVENTION

The present application relates generally to technologies for producing customized images on workpieces, and in particular, to a flexible and effective system and method for decorating consumer products in different shapes, sizes, and form factors.

In recent years, the popularization of digital media and digital printing technologies has created great demands for consumer products decorated with customized images. Most of such customized images are printed by digital printers with colorants such as inks or dyes. Some objects, however, are not suitable for receiving inks or dyes. Some other objects are aesthetically more appealing if the images are directly printed, engraved, carved, or etched on their surfaces without using colorants. Such objects can be made of materials such as glass, plastic, wood, stone, metal, laminates, leather or faux leathers, fabrics made of natural or synthetic materials, vinyl, composite materials, paper substrates, etc. The personalized products can come in different shapes, sizes, and form factors, including two-dimensional and three-dimensional objects, such as photo mugs, ties and scarves, photo magnets, photo coasters, personalized dog tags, personalized pet bowls, canvas prints, personalized key chains, personalized mobile phone cases, and so on.

A drawback for the current manufacturing processes is that they can handle very limited shapes, sizes, and form factors in the workpieces. Moreover, the handling and tracking of workpieces require a lot of labor and time, which adds cost to the manufacturing process. Another drawback for the current manufacturing process is that it is error-prone because the workpieces and their tracking labels are paired manually and must be matched together visually, which results in the wrong item being sent to a customer.

SUMMARY OF THE INVENTION

In a general aspect, the present invention relates to a marking system for decorating one or more workpieces that includes a plurality of marking stations that can mark product images on blank workpieces to produce product workpieces, at least some of which have different sizes, shapes, materials, or a combination thereof; a control system that can select one of the plurality of marking stations and send product image data to the selected one of the plurality of marking stations; and a robotic manipulator that can transport a blank workpiece to the selected one of the plurality of marking stations under the control of the robotic manipulator, wherein the selected one of the plurality of marking stations can mark the product image the blank workpiece based on the product image data which produces a product workpiece, wherein the robotic manipulator can remove the product workpiece from the selected one of the plurality of marking stations.

Implementations of the system may include one or more of the following. At least one of the blank workpieces is labeled with a blank workpiece identification code, the marking system can further include a workpiece scanner configured to scan the blank identification code and send the blank workpiece identification code to the control system. The control system can select the one of the plurality of marking stations based on one or more of a size, a shape, a material, or a marking technique associated with the blank workpiece identification code. The control system can identify the product image data based on the blank workpiece identification codes, and control the selected one of the plurality of marking stations to produce the product image on the workpiece based on the identified product image data. The marking station can receive data corresponding to the product image from the control system, and mark the workpiece with the product image based on the data received from the control system. The control system can select one of the plurality of marking stations based on operating parameters of the plurality of the marking stations or one or more parameters associated with the workpiece. The operating parameters associated with the workpiece can include a shape of the workpiece, a size of the workpiece, or a material of the workpiece. The operating parameters include a type of marking technology associated with each of the marking stations. The operating parameters include an availability of the marking stations. At least one of the workpieces is not labeled with a blank workpiece identification code, wherein one of the marking stations can mark the product image on the workpiece. The marking system can further include a labelling station that can provide a product identification code on the workpiece after the workpiece is marked with the product image at one of the marking stations. The marking system can further include one or more loading stations for receiving and storing the one or more workpieces. One of the plurality of marking stations can includes a marking head that can mark a product image on the workpiece; and a transport mechanism that can move the marking head relative to the workpiece during marking of the product image on the workpiece. At least one of the plurality of marking stations can print colorant on the workpiece. At least one of the plurality of marking stations can etch a pattern on a workpiece using a laser. At least one of the plurality of marking stations can engrave or carve a pattern on a workpiece. The control system can include a data storage for storing product images and blank workpiece identification codes. The control system can include an image processor configured to convert the product image retrieved from the data storage into a pixelated resolution corresponding to a scanning resolution of the marking head, wherein the control system is configured to control the marking head based on the pixelated resolution for marking the workpiece with the product image.

The disclosed system and method can include one or more of the following advantages. The disclosed system and method can produce customized markings on a wide range of shapes, sizes, and form factors in the workpieces. The workpieces are transported automatically using a robotic manipulator between marking systems, and loading and output zones, which significantly improves manufacturing efficiency. Moreover, the workpieces are automatically tracked at different stages of the manufacturing process, which prevents the tracking and matching errors in conventional systems, which reduces waste and cost of rework. Furthermore, the disclosed system and method are compatible with different types of printing and marking technologies for customizing workpieces.

These and other aspects, their implementations and other features are described in detail in the drawings, the description and the claims.

DETAILED DESCRIPTION OF THE INVENTION

Reference will now be made in detail to specific embodiments or features, examples of which are illustrated in the accompanying drawings. Generally, corresponding reference numbers will be used throughout the drawings to refer to the same or corresponding parts. Also, wherever possible, the same reference numbers will be used throughout the drawings to refer to the same or the like parts.

Figure 1:
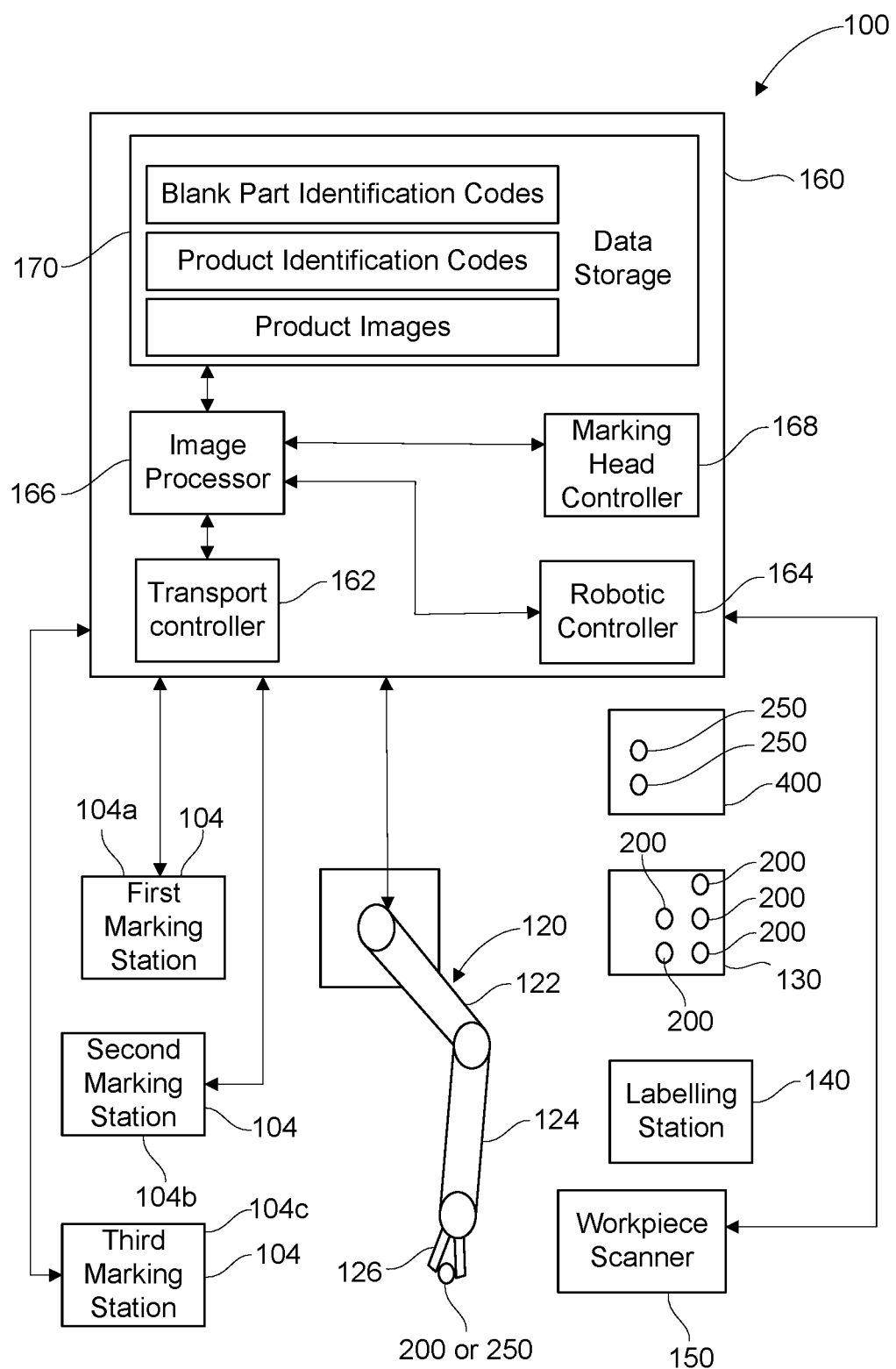
FIG. 1 illustrates a schematic of a marking system in accordance with some embodiments of the disclosure.

Referring to FIG. 1, an exemplary marking system 100 for decorating one or more blank workpieces 200, for example, a first blank workpiece 200a, a second blank workpiece 200b, a third blank workpiece 200c, and a fourth blank workpiece 200d, is shown. In some embodiments, the blank workpieces 200a, 200b, 200c, 200d may be identical to each other, while in other embodiments, the blank workpieces 200a, 200b, 200c, 200d may include different shape and sizes. The marking system 100 includes a plurality of marking stations 104, for example a first marking station 104a, a second marking station 104b and a third marking station 104c, for marking or decorating the blank workpieces 200 with product images, which produce product workpieces 250.

In the present disclosure, the term "product image" may include photographic images provided by customers or service providers, graphic designs, and artwork (including drawings, indicia, text, symbols, graphics, etc.) used that decorates a final product. Although three marking stations are shown, it may be appreciated that the marking system 100 may include any number of marking stations, and the scope and embodiments of the disclosure are not limited by the number of the marking stations. The term "blank workpiece" refers to an object that is to be marked with an image, graphics, or text to form a final product. The term "product workpiece" refers to the final product that is formed by the workpiece marked with an image, graphics, or text.

Figure 2A:
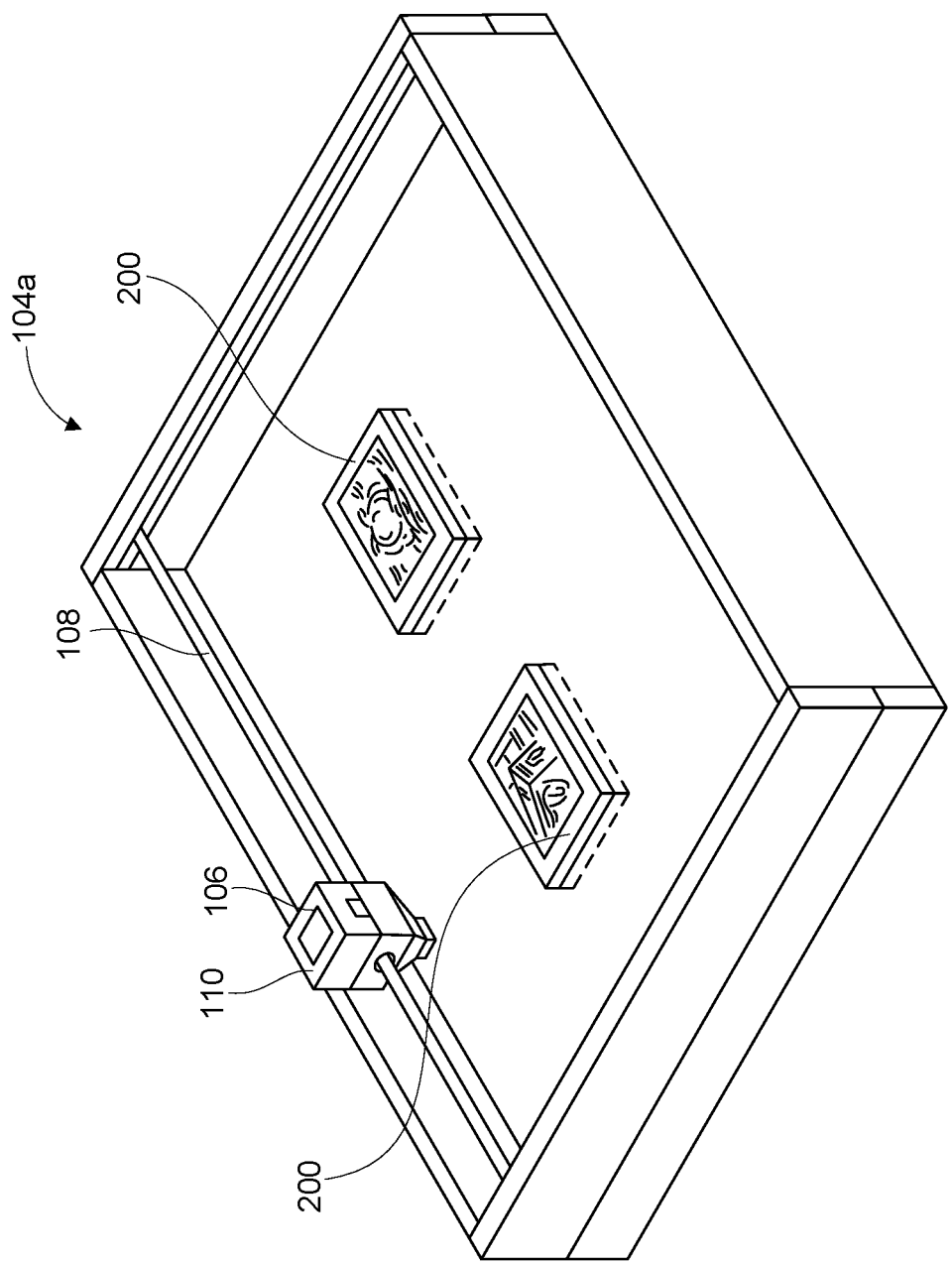
FIG. 2A illustrates a detailed view of an exemplified marking station suitable of the marking system and capable of laser etching one or more workpieces in accordance with some embodiments of the disclosure.

Referring to FIG. 2A, a marking station 104a includes a marking head 106 and a transport mechanism 108 for providing a relative motion between the marking head 106 and the workpiece 108. In some embodiments, the marking head 106 may include a laser head 110. The marking head 106 can employ other types of etching or carving techniques to mark images on the blank workpieces 200 to produce product workpieces 250. In some embodiments, it may include a laser head 110 for laser etching the product image on the workpiece 200. Further, the laser head 110 may etch a blank workpiece 200 disposed on a flat platform, or cylindrical shaped blank workpieces 200 rotating around a shaft. In an exemplary embodiment, a marking station 104a can include a flat platform on which blank workpieces 200 can be placed for etching. A marking station 104b may include the shaft for rotating cylindrical workpieces for etching the blank workpieces 200.

Figure 2B:
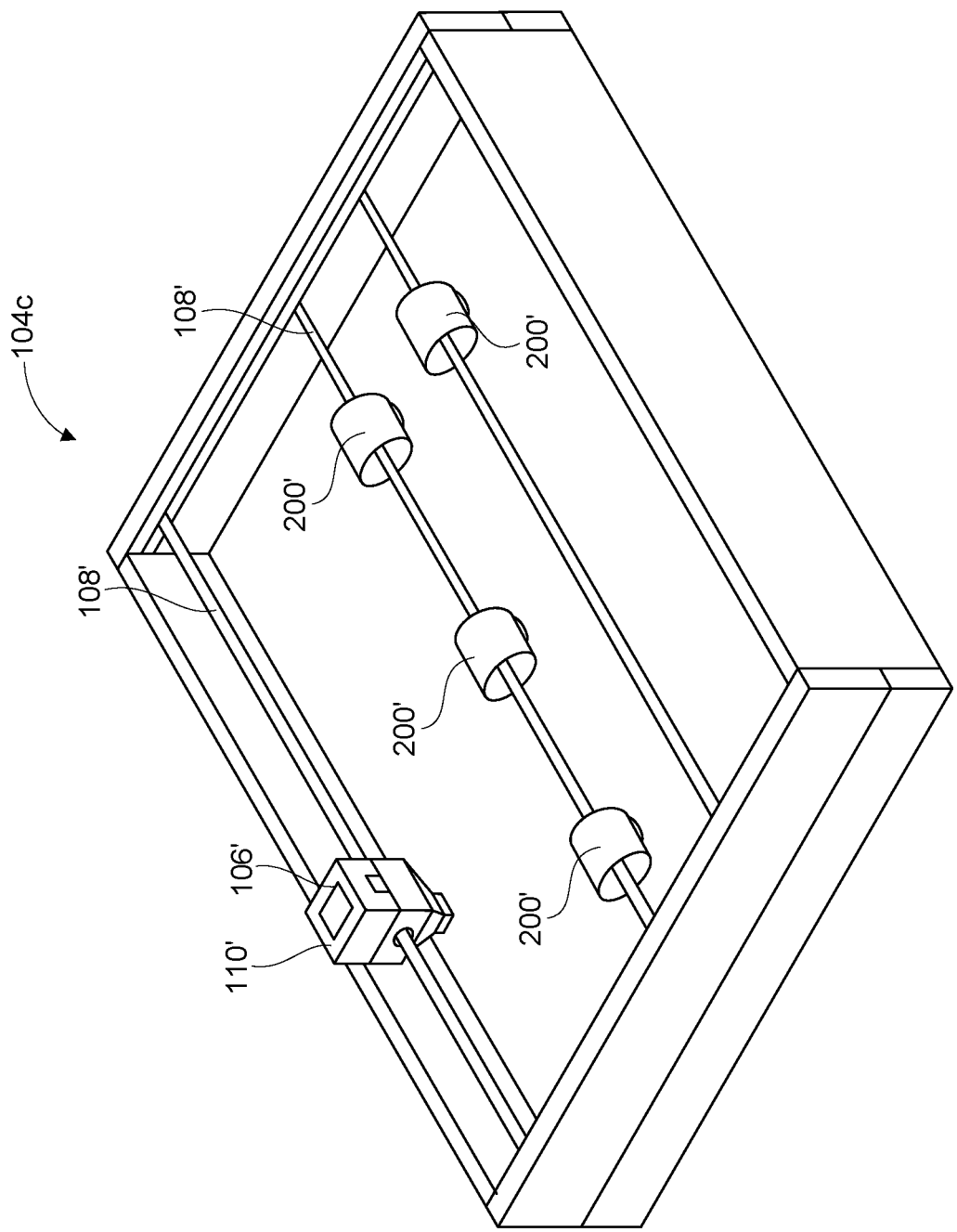
FIG. 2B illustrates a detailed view of another exemplified marking station of the marking system and capable of colorant printing one or more workpieces in accordance with some embodiments of the disclosure.

Referring to FIG. 2B, a marking station 104c is shown according to an alternative embodiment of the disclosure. The marking station 104c includes a marking head 106' as a colorant printing head 110', and a transport mechanism 108' for providing a relative motion between the colorant printing head 110' and a blank workpiece 200'. In some embodiments, the colorant printing head 110' may include a printing head for printing the product image on the blank workpiece 200'. Further, the colorant printing head 110' may print on blank workpieces 200' disposed on a flat platform, or cylindrically shaped blank workpieces rotating around a shaft.

It should be noted that the marking stations 104 can employ other types of marking technologies not described above, such as impact marking, including engraving and carving, etc. Moreover, the marking stations 104 are compatible with different types of colorant printing technologies including impact printing and non-impact printing such as ink jet printing, thermal dye sublimation, electrophotographic printing using solid or liquid toners, and so on.

Additionally, the marking system 100 includes a robotic manipulator 120 that can move blank workpieces 200 from one or more loading stations 130 to one of the plurality of marking stations 104 and move product workpieces 250 to one or more unloading station 400 after the marking process is complete. In the present disclosure, the term "robotic manipulator" refers to a device that can handle and move an object similar to a human's arm under the control of a computer. The movements that can be achieved by a "robotic manipulator" can include translations and rotations in all directions. The "robotic manipulator" also includes computer vision that can coordinate the handling and movements of an object relative to objects in the surrounding. In the illustrated embodiment, only one loading station 130 and one unloading station 400 are shown. However, the marking system 100 may include any number of loading stations and unloading stations. The loading station 130 may be referred to as a station, which receive and stores blank workpieces 200 which are yet be marked with corresponding product images, while unloading station 400 may be referred to as a station where product workpieces 250 are received or stored after completion of the marking process.

The robotic manipulator 120 may include one or more arms, for example a first arm 122 and a second arm 124 connected to the first arm 122, and an end effector 126 connected to the second arm 124 and adapted to hold a blank workpiece 200 or a product workpiece 250. The second arm 124 is configured to pivot and/or rotate relative to the first arm 122, and similarly, the end effector 126 may pivot and/or rotate relative to the second arm 124 to facilitate a movement of a blank workpieces 200 or a product workpiece 250 from the loading station 130 to one of the marking station stations 104 and from the marking stations 104 to the unloading station 400. In some embodiments, the robotic manipulator 120 may include one or more actuators (not shown), such as servo motors for moving the first arm 122, the second arm 124, and the end effector 126. Although servomotors are contemplated as the actuators, it may be appreciated that other type of actuators, such as, but not limited to, electric motors, fluid cylinders, etc. In a scenario, the one or more actuators may include absolute encoders to facilitate operation of the actuators at 0.1 mm accuracy and 1 m/s speed.

Further, the marking system 100 may include one or more labelling stations 140 for labelling a blank workpiece 200 with an identification code. In some embodiments, the identification code facilitates in identifying the blank workpiece 200, for example, a shape and a size of the blank workpiece 200, and accordingly may facilitate in identifying corresponding product image to be marked on the blank workpiece 200. In such a case, the identification code may correspond to a blank workpiece identification code that may be provided on the workpiece 200 before marking the blank workpiece 200 with the corresponding product image.

In some other embodiments, identification codes may be provided or marked on the blank workpieces 200 after the blank workpieces 200 are marked with associated product images at the marking stations 104. For so doing, the robotic manipulator 120 may move the blank workpieces 200 to the labelling station 140 after marking of the blank workpiece 200 is completed at the marking station 104. In such cases, the identification codes may correspond to product identification codes, which may facilitate identifying post processing related details, such as shipping of workpieces, packaging of workpieces, customer details, etc.

In some implementations, the identification code may be printed on or attached a blank workpiece 200 at a labelling station 140. some embodiments, the labelling station 140 can include a labelling device, such as a printer, to print a label comprising a blank workpiece identification code on the workpiece 200. In certain implementations, the identification code can be a two-dimensional or a three-dimensional barcode, or a QR code, or any other representative code.

In some embodiments, the marking system 100 may include a single labelling station 140 for labelling all the blank workpieces 200 with corresponding identification codes. Alternatively, the marking system may include a plurality of labelling stations 140. In such a case, one labelling station 140 may be associated with one marking station 104, and the blank workpiece 200 that is moved to one of the plurality of marking stations 104 is labelled by the associated labelling station 140.

Additionally, or optionally, the marking system 100 may include one or more workpiece scanners 150 for scanning a labelled blank workpiece 200 before marking the product images on the blank workpieces 200. In some embodiments, the marking system 100 may include a single workpiece scanner for scanning all the labelled blank workpieces 200. Alternatively, the marking system 100 may include a plurality of workpiece scanners 150 such that one workpiece scanner may be associated with one marking station. In such a case, a blank workpiece 200 is scanned by an associated workpiece scanner 150 before being moved to one of the plurality of marking stations 104.

In some embodiments, the workpiece scanner 150 is adapted to scan a surface of the labelled blank workpiece 200, and/or may scan the blank workpiece identification code provided on the blank workpiece 200. The workpiece scanner 200 may be communicatively coupled with a control system 160 of the marking system 100, and may send a data corresponding to the blank workpiece identification code of the labelled blank workpiece 200 to the control system 160 for further processing. The control system 160 may retrieve a job id and an associated job file corresponding to the blank workpiece identification code to control the robotic manipulator 120 and one of the marking stations 104 to mark the blank workpiece 200 with associated product image.

Still referring to FIG. 1, the control system 160 may include a transport controller 162, a robotic controller 164, an image processor 166, a marking head controller 168, and a data storage 170 for storing various information related to the blank workpiece identification codes, product identification codes, job identification codes, workpieces, product images, delivery information, packaging information, customer preferences, etc. The robotic controller 164 is configured to control the movements of the robotic manipulator 120 by controlling the actuators associated with the first arm 122, the second arm 124, and the end effector 126. In some embodiments, before moving the blank workpiece 200 to one of the plurality of marking stations 104, the robotic controller 164 selects the one of the plurality of marking stations 104 based on operating parameters of the plurality of the marking stations 104. In some embodiments, the operating parameters may include an availability of the marking stations 104, a type of the marking head 106 of the marking station 104, etc. In certain implementations, the robotic controller 164 may select the one of the plurality of marking stations 104 based on one or more parameters associated with the blank workpiece 200. In a scenario, the parameters may include a shape of the workpiece, a size of the workpiece, a material of the workpiece, etc. In some embodiments, the robotic controller 164 may select the one of the plurality of marking stations 104 based on both the operating parameters of the marking stations 104 and the one or more parameters of the blank workpiece 200. Further, after selecting a marking station, for example the first marking station 104a, from the plurality of the marking stations 104, the robotic controller 164 is configured control the robotic manipulator 120 to move the blank workpiece 200 to the selected marking station, for example the first marking station 104a, for marking the blank workpiece 200 with the product image. The robotic system can be preprogrammed to follow a static order for processing or be an adaptive program including artificial intelligence.

The transport controller 162 controls the transport mechanism 108 to control a relative movement between the marking head 106 and the blank workpiece 200 for marking the product image on the blank workpiece 200. In some embodiments, the transport mechanism 108 may move and control a movement of the marking head 106. Additionally, or optionally, the transport mechanism 108 is adapted to move the blank workpiece 200 in conjunction with the marking head 106 to facilitate the marking of the product image on the blank workpiece 200. In such a case, the transport controller 162 may control the movements of both the marking head 106 and the blank workpiece 200. For so doing, the transport controller 162 may control one or more actuators, such as electric motors, for enabling and controlling the movements of the marking head 106 and/or the blank workpiece 200. In an exemplary embodiment one or more marking stations, for example, the first marking station 104a and the third marking station 104c, are adapted to process substantially flat workpieces. In such a case, transport controller 162 may control the transport mechanism 108 such that the marking head 106 may move in a continuous x-direction across the blank workpiece 200, and the blank workpiece 200 moves or advances one line at a time in the y-direction. In certain other implementations, a marking station, for example, the second marking station 104b, is adapted to mark cylindrical-shaped blank workpieces 200. In such a case, transport controller 162 may control the transport mechanism 108 such that the marking head 106 may only move in x-direction, while the blank workpiece 200 is rotated one line at a time in the y-direction for marking the product image on the blank workpiece 200. The transport controller 162 may be in communication with the data storage 170 and/or the image processor 166, and may operate the transport mechanism 108 based on the inputs received from the image processor 166.

In some embodiments, the image processor 166 is also in communication with the one or more workpiece scanners 150, and receives a data corresponding to the blank workpiece identification code from the workpiece scanner 150. In some embodiments, each of the marking stations 104 can be paired with a workpiece scanner 150 for scanning blank workpieces 200 being loaded into the corresponding marking station 104. The image processor 166 is also in communication with the data storage 170, and retrieves the product image from the data storage 170 based on the blank workpiece identification code. In some other embodiment, the workpiece scanner 150 is omitted from the marking system 100. In such cases, the image processor 166 may retrieve the product image from the data storage 170 according to a predefined sequence. The predefined sequence may be stored in the data storage 170 before starting a marking operation.

Upon receiving the product image from the data storage 170, the image processor 166 processes the product image received from the data storage 170 in preparation for marking a blank workpiece 200. For so doing, the image processor 166 may perform resizing of the product image to the size suitable for the dimensions of the blank workpiece 200. Further, the image processor 166 may render the product image to achieve certain image effects on a particular material type (e.g. glass, stone, wood, metal, etc.) of the blank workpiece 200. Further, the image processor 166 is adapted to convert the product image to pixel resolution(s) compatible with the scanning resolution of the marking head 106. In certain implementation, a data related to the scanning resolution of the marking head 106 is stored in the data storage 170, and the image processor 166 may receive the data/information related to the scanning resolution from the data storage 170. Alternatively, the image processor 166 may be communicably coupled to the marking head controller 168, and may receive the data/specification/information related to scanning resolution of the marked head 106 from the marking head controller 168.

The marking head controller 168 is configured to operate/control the marking head 106 based on the pixelated resolution of the product image received from the image processor 166, and may control power and power modulation to the marking head 106. The power modulation may be based on the pixel values of the pre-processed images produced by the image processor 166. In accordance with an exemplary embodiment, the marking head controller 168 is configured to set the power level of the marking head 106, for example, the laser head 110, to accommodate marking or laser etching on blank workpieces 200. Before the laser head 110 starts etching an image on the blank workpiece 200, the marking head controller 168 sets the power level of the laser head 110 to Pw, which is selected to etch and remove or fracture materials from the particular material composition of the blank workpiece 200 (e.g. glass, wood, stone, metal, plastic, etc.), at the specific power level set which is consistent with the desired output on the blank workpiece 200. In the present disclosure, the power level of the laser head 110 may be defined by the maximum, the average, or other relative magnitude for the next period of marking, such as laser etching.

After the marking head 106 is positioned above an image forming area in a blank workpiece 200, the marking head 106 is modulated by the marking head controller 168 in accordance with the product image. The marking head 106 selectively marks various locations of the blank workpiece 200 in a pixel wise fashion to form an image pattern that mimics the product image.

Figure 3:
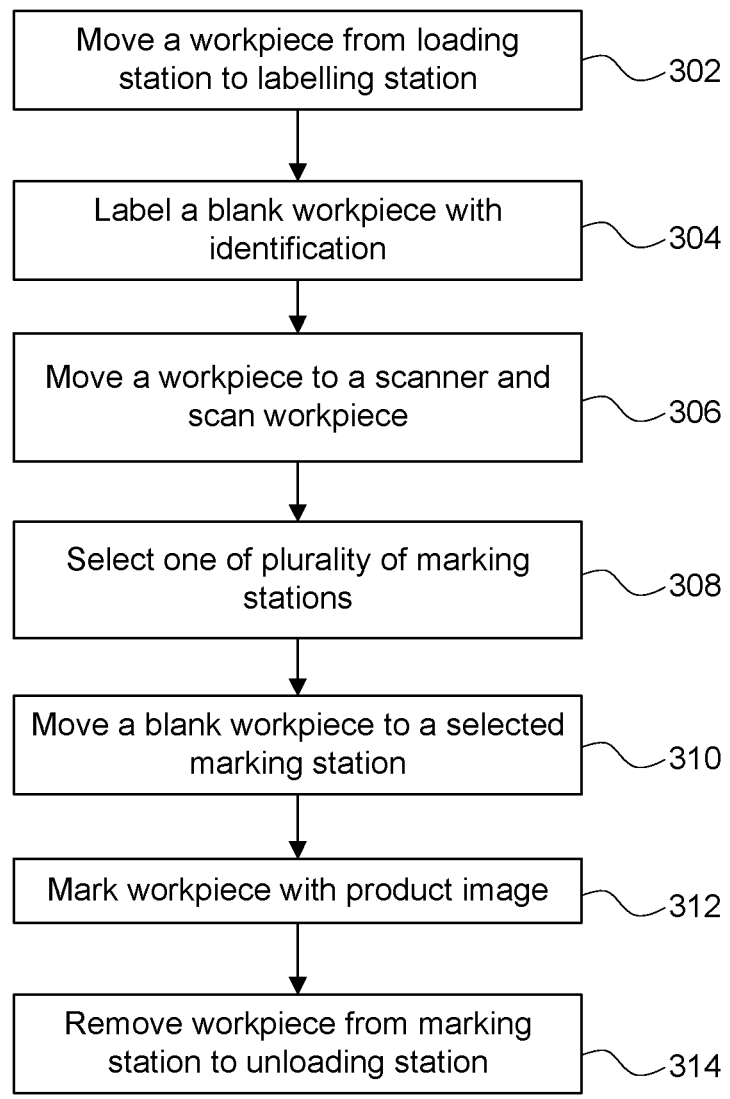
FIG. 3 is a workflow diagram compatible with the marking system shown in FIG. 1.

Referring to FIG. 3, a method for marking workpieces is now described. The robotic controller 120 may pick up a blank workpiece 200 from the loading station 130 and transfers the workpiece 200 to the labelling station 140 (step 302). The blank workpiece can be labeled by a blank workpiece identification code to the workpiece at the labelling station 140 (step 304). In some embodiments, the blank workpiece identification code can be in the form a QR code, barcode, an alphanumeric symbol, and can include a thumbnail image of the product image to be marked on the blank workpiece 200. The labeled blank workpiece 200 can then be placed on the loading station 130 or directly moved to scanning station.

It should be noted that in some implementations, the blank workpieces 200 can be pre-labeled before received by the marking system 100 (i.e. the loading station 130). Steps 302 and 304 can be skipped in this embodiment.

At step 306, the robotic manipulator 120, under the control of the robotic controller 164, moves a labelled blank workpiece 200 from the loading station 130 or the labelling station 140 to the workpiece scanner 150. The workpiece scanner 150 scans the blank workpiece identification code provided on the blank workpiece 200, and share the data associated with the blank workpiece identification code to the control system 160. The control system 160, upon receiving the blank workpiece identification code from the workpiece scanner 150, retrieves a job identification and a corresponding job file from the data storage 170 based on the blank workpiece identification code. The job file may include information related to one or more of a size of the blank workpiece 200, a shape of the blank workpiece 200, a material of the blank workpiece 200, information about the product image to be marked on the blank workpiece 200, and an information about the type of marking, such as a laser marking, CMYK marking etc.

Thereafter, the control system 160 determines which marking stations out of the plurality of the marking stations 104 for marking the blank workpiece 200 (step 308). For so doing, the control system 160 can determine the operating parameters of the plurality of marking stations 104 and/or the parameters associated with the blank workpiece 200. For example, the control system 160 can select the first marking station 104a when the first marking station 104a is either idling or about to complete the marking of another workpiece, therefore will be available relatively earlier for marking the blank workpiece 200 as compared to other marking stations 104b, 104c.

Moreover, the control system selects a marking station that is capable providing the type of marking technique required for marking a specific blank workpiece 200 (step 308). For example, the control system 160 may select the second marking station 104b that is capable of producing laser etching patterns if the blank workpiece 200 is a blank glassware. The workpiece maybe cylindrical in shape that can be handled by the second marking station 104b is adapted to mark the blank workpiece 200 with the product image. After selecting a suitable marking station, the control system 160 via the robotic controller 164 may move the blank workpiece 200 to the selected marking station, for example, the first marking station 104a, and controls the end effector 126 to dispose the blank workpiece 200 on a platform of the selected marking station, for example, the first marking station 104a.

Next, the robotic controller moves the blank workpiece 200 from the workpiece scanner 150 to the selected marking station 130 (step 310). The product image is then marked on the blank workpiece 200 (step 312). To facilitate the marking of the workpiece 200 with the product image, the image processor 166 shares a pixelated image to the marking head controller 168 for controlling the movements of the marking head 106. For so doing, in some embodiments, the image processor 166 may retrieve the product image based on the blank workpiece identification code received from the workpiece scanner 150, For so doing, the image processor 166 may look for a job file containing a name or a code in the data storage 170 corresponding to blank workpiece identification code, and retrieve the job file thereof. The retrieved job file may contain the product image along with the various other details, such as a location, for example coordinates of the product image relative to edges and/or center of the blank workpiece 200 and/or details of the colors of the product image, etc. Upon retrieving the product image from the data storage 170, the image processor 166 may resize the product image based on the size and/or the shape of the blank workpiece 200, and convert the product image to pixel resolution(s) compatible with the scanning resolution of the marking head 106.

Thereafter, the image processor 166 shares the pixelated resolution of the product image with the marking head controller 168 that controls the marking head 106, and the transport controller 162 that controls the transport mechanism 108 for marking the product image on the blank workpiece 200, which produces a product workpiece 250. Upon receiving the pixelated data related to the product image, the marking head controller 168 controls the marking head 106 to selectively marks various locations of the blank workpiece 200 in a pixel wise fashion to form an image pattern that mimics the product image. In an exemplary embodiment, the marking head controller 168 may control the laser head 110 to selectively burn the areas of the blank workpiece 200 to etch the product image on the blank workpiece 200. Further, in conjunction with the marking head controller 168, the transport controller 162 controls the movement of the marking head 106 and/or the blank workpiece 200 to facilitate a movement of the marking head 106 in a pixelwise manner relative to the blank workpiece 200 to mark the workpiece 200 with the product image to produce a product workpiece 250.

Upon completion of the marking of the product image on the workpiece, the robotic controller 164 controls the robotic manipulator 120 to move the product workpiece 250 from the marking station 104 to the unloading station 400 (step 314).

In some embodiments, the blank workpieces 200 in the loading station 130 are not labeled with blank workpiece identification codes. Such blank workpieces 200 may be of same size, shape, and material, and may relate to single identical batch. In such a case, the workpiece scanner 150 may be omitted from the marking system 100. In such a case, the image processor 166 may be adapted to access the data storage 170 to retrieve the product images corresponding to the blank workpieces 200. For so doing, the product images are stored in a predefined sequence in the data storage 170, and the image processor 166 is adapted to access the product images in the predefined sequence. Further, after marking the blank workpiece 200 with the product image, the robotic controller 164 moves the blank workpieces 200 from the marking stations 104 to the labelling station 140. In this embodiment, the marking system 100 can optionally include a labelling station 140. After marking at the marking stations 104, the product blank workpieces 250 may move to the labelling station 140. At the labelling station 140, a product identification code may be labelled on the product workpiece 250. For example, product identification code may facilitate an identification of the customer details, such as address of the customer, any packaging related details, etc. Upon completion of the labelling of the product workpiece 250, the robotic controller 164 controls the robotic manipulator 120 to move the working piece from the labelling station 140 to the unloading station 400.

In this manner, the marking system 100 is configured to automatically decorate the workpiece with the product image, thereby reducing labor and time leading to a reduction in overall manufacturing cost. Further, the marking system 100 reduces errors in the manufacturing process as the product image is automatically extracted based on the unique identifier, and hence ensuring that the workpiece is marked with desired product image.

What is claimed is:

1. A marking system for decorating one or more workpieces, comprising:
   a plurality of marking stations configured to mark product images on blank workpieces to produce product workpieces, at least some of which have different sizes, shapes, materials, or a combination thereof;
   a control system configured to select one of the plurality of marking stations and send product image data to the selected one of the plurality of marking stations, wherein the control system includes data storage configured to store product images and blank workpiece identification codes; and
   a robotic manipulator configured to transport a blank workpiece to the selected one of the plurality of marking stations under the control of the robotic manipulator,
   wherein the selected one of the plurality of marking stations is configured to mark the product image on the blank workpiece based on the product image data which produces a product workpiece,
   wherein the robotic manipulator is configured to remove the product workpiece from the selected one of the plurality of marking stations.

2. The marking system of claim 1, wherein at least one of the blank workpieces is labeled with a blank workpiece identification code, the marking system further comprising:
   a workpiece scanner configured to scan the blank identification code and send the blank workpiece identification code to the control system.

3. The marking system of claim 2, wherein the control system is configured to select the one of the plurality of marking stations based on one or more of a size, a shape, a material, or a marking technique associated with the blank workpiece identification code.

4. The marking system of claim 1, wherein the control system is configured to identify the product image data based on the blank workpiece identification codes, and control the selected one of the plurality of marking stations to produce the product image on the workpiece based on the identified product image data.

5. The marking system of claim 1, wherein the selected one of the plurality of marking stations is configured to receive data corresponding to the product image from the control system, and mark the workpiece with the product image based on the data received from the control system.

6. The marking system of claim 1, wherein the control system is configured to select one of the plurality of marking stations based on operating parameters of the plurality of the marking stations or one or more parameters associated with the workpiece.

7. The marking system of claim 6, wherein the operating parameters associated with the workpiece include a shape of the workpiece, a size of the workpiece, or a material of the workpiece.

8. The marking system of claim 6, wherein the operating parameters include a marking technology associated with each of the plurality of marking stations.

9. The marking system of claim 6, wherein the operating parameters include an availability of the plurality of marking stations.

10. The marking system of claim 1, wherein at least one of the workpieces is not labeled with a blank workpiece identification code, wherein one of the marking stations is configured to mark the product image on the workpiece.

11. The marking system of claim 10, further comprising a labelling station configured to provide a product identification code on the workpiece after the workpiece is marked with the product image at one of the marking stations.

12. The marking system of claim 1 further comprising one or more loading stations for receiving and storing the one or more workpieces.

13. The marking system of claim 1, wherein one of the plurality of marking stations includes:
a marking head configured to produce a product image on the workpiece; and
a transport mechanism configured to move the marking head relative to the workpiece during marking of the product image on the workpiece.

14. The marking system of claim 1, wherein at least one of the plurality of marking stations is configured to print colorant on the workpiece.

15. The marking system of claim 1, wherein at least one of the plurality of marking stations is configured to etch a pattern on a workpiece using a laser.

16. The marking system of claim 1, wherein at least one of the plurality of the marking station is configured to engrave or carve a pattern on a workpiece.

17. The marking system of claim 1, wherein the control system includes an image processor configured to convert the product image retrieved from the data storage into a pixelated resolution corresponding to a scanning resolution of the marking head, wherein the control system is configured to control the marking head based on the pixelated resolution for marking the workpiece with the product image.

18. A marking system for decorating one or more workpieces, comprising:
a plurality of marking stations configured to mark product images on blank workpieces to produce product workpieces, at least some of which have different sizes, shapes, materials, or a combination thereof, wherein at least one of the blank workpieces is labeled with a blank workpiece identification code;
a control system configured to select one of the plurality of marking stations and send product image data to the selected one of the plurality of marking stations;
a robotic manipulator configured to transport a blank workpiece to the selected one of the plurality of marking stations under the control of the robotic manipulator; and
a workpiece scanner configured to scan the blank identification code and send the blank workpiece identification code to the control system,
wherein the selected one of the plurality of marking stations is configured to mark the product image on the blank workpiece based on the product image data which produces a product workpiece,
wherein the robotic manipulator is configured to remove the product workpiece from the selected one of the plurality of marking stations.

19. A marking system for decorating one or more workpieces, comprising:
a plurality of marking stations configured to mark product images on blank workpieces to produce product workpieces, at least some of which have different sizes, shapes, materials, or a combination thereof, wherein at least one of the blank workpieces is labeled with a blank workpiece identification code;
a control system configured to select one of the plurality of marking stations and send product image data to the selected one of the plurality of marking stations, identify the product image data based on the blank workpiece identification code, and control the selected one of the plurality of marking stations to produce the product image on the workpiece based on the identified product image data; and
a robotic manipulator configured to transport a blank workpiece to the selected one of the plurality of marking stations under the control of the robotic manipulator,
wherein the selected one of the plurality of marking stations is configured to mark the product image on the blank workpiece based on the product image data which produces a product workpiece,
wherein the robotic manipulator is configured to remove the product workpiece from the selected one of the plurality of marking stations.

20. A marking system for decorating one or more workpieces, comprising:
a plurality of marking stations configured to mark product images on blank workpieces to produce product workpieces, at least some of which have different sizes, shapes, materials, or a combination thereof, wherein at least one of the workpieces is not labeled with a blank workpiece identification code, wherein one of the marking stations is configured to mark the product image on the workpiece;
a control system configured to select one of the plurality of marking stations and send product image data to the selected one of the plurality of marking stations;
a robotic manipulator configured to transport a blank workpiece to the selected one of the plurality of marking stations under the control of the robotic manipulator; and
a labelling station configured to provide a product identification code on the workpiece after the workpiece is marked with the product image at one of the marking stations,
wherein the selected one of the plurality of marking stations is configured to mark the product image on the blank workpiece based on the product image data which produces a product workpiece,
wherein the robotic manipulator is configured to remove the product workpiece from the selected one of the plurality of marking stations.

* * * * *